United States Patent [19]

Chaney

[11] 4,284,734

[45] Aug. 18, 1981

[54] MOLDABLE BLEND OF INTERPOLYMER OF RUBBER, METHACRYLIC ACID AND STYRENE WITH POLYURETHANE

[75] Inventor: Clarence E. Chaney, Verona, Pa.

[73] Assignee: Arco Polymers, Inc., Philadelphia, Pa.

[21] Appl. No.: 186,030

[22] Filed: Sep. 11, 1980

[51] Int. Cl.³ .................. C08L 75/04; C08L 75/06
[52] U.S. Cl. ........................... 525/92; 525/66; 525/130
[58] Field of Search .................. 525/92, 66, 130

[56] References Cited

U.S. PATENT DOCUMENTS

| | | | |
|---|---|---|---|
| 4,088,627 | 5/1978 | Gergen | 525/92 |
| 4,096,200 | 6/1978 | Lenz | 525/66 |

*Primary Examiner*—Paul Lieberman
*Attorney, Agent, or Firm*—John R. Ewbank

[57] ABSTRACT

The invention concerns thermoplastic molding compositions consisting essentially of a blend of:
- A. From about 40% to about 70% by weight of an interpolymer comprising from about 8% to about 16% block polyalkadiene, and from about 51% to about 85% styrene and from about 5% to about 35% methacrylic acid.
- B. From about 30% to about 60% of a polyurethane thermoplastic rubber.

1 Claim, No Drawings

MOLDABLE BLEND OF INTERPOLYMER OF RUBBER, METHACRYLIC ACID AND STYRENE WITH POLYURETHANE

BACKGROUND OF INVENTION

This invention relates to moldable materials prepared by blending thermoplastic compositions to obtain multiple component blends which have a combination of advantageous characteristics. The conversion of plastics utilizes machinery adapted to fabricate the plastic at temperatures within a range which is significantly narrower than the range of softening points of the polymeric resins which scientists have produced. Moreover, impact resistance for blends is difficulty attainable, so that any blend having outstanding impact resistance has aroused the interest of industrial designers.

Polyurethane resin is an example of a polymer having sufficiently high impact resistance and sufficient elasticity to be employed as a thermoplastic rubber. It is not practical to employ such thermoplastic rubber in some conventional equipment for molding selected articles having restricted flexibility. However, blends comprising resins and rubbery materials can be molded to produce impact-resistant articles of interest to some fabricators.

Polystyrene is among the less costly of commercially used resins, but some types of polystyrene have blending characteristics making them unsuitable for fabrication of articles having high resistance to impact. Various proposals have been made for blends comprising polystyrene and appropriate rubbery components.

Lauchlan, et al, U.S. Pat. No. 3,660,531 describes the preparation of a resin blend containing polystyrene and significant amounts of an elastomer for imparting impact resistance.

Fava U.S. Pat. No. 4,129,619 describes a blend of polymethyl methacrylate and styrene-maleimide copolymer.

Fava U.S. Pat. No. 4,129,615 describes a blend of styrene-maleimide with an interpolymer of styrene, methyl methacrylate, and a rubbery component comprising 65-95% alkadiene and 5-35% vinyl aromatic component.

Most attempts to mix pellets of different molding compositions are unsatisfactory because of the general incompatibility of polymeric materials. When a mixture of molding pellets is extruded, there is generally a very weak extrudate by reason of the fracture lines at the boundaries amongst the different compositions. The discovery of a compatible blend of plastic, sometimes referred to as "plastic alloys", is a significant and unexpected discovery by reason of the incompatibility of most of the conceivable permutations of mixtures of plastics.

Nowithstanding the persistent effort to prepare appropriate blends, there has been a failure by others to prepare blends meeting some of the combinations of desired properties which are attained by the present invention.

SUMMARY OF THE INVENTION

In accordance with the present invention, a thermoplastic molding composition consists essentially of a blend of:

A. From about 40% to about 70% by weight of an interpolymer comprising from about 8 to about 16% block polyalkadiene, from about 51 to about 85% styrene and from about 5% to about 35% methacrylic acid.

B. From about 30% to about 60% of a polyurethane thermoplastic rubber.

The invention is further clarified by reference to a plurality of preparations, comprising controls and examples.

EXAMPLES 1-4

A molding composition blend was prepared by utilizing an extruder in which the mixture formed in such extruder was divided, two-thirds being directed for forward processing and extrusion, and one-third of such mixture being directed for recycle through the mixing zone of the extruder. A conventional extruder can be operated so that internal recycling occurs, and so that the rate of feeding fresh pellets and the rate of extrusion of product pellets is about half of that which would normally occur with a comparable amount of material in the extruder and comparable power consumption. Other variations of blending partaking of the nature of recycle extrusion may be employed.

Thermoplastic polyurethanes are described in Wolf et al U.S. Pat. No. 3,929,928 (assigned to Uniroyal) derived from Ser. No. 345,923 filed Mar. 29, 1973, corresponding to Canadian Pat. No. 1,003,991 of Jan. 18, 1977, and in "Polyurethane Technology" by Bruns, Interscience pp 198-200 and 1968 Modern Plastics Encyclopedia p 289.

Tetramethylene glycol is esterified with adipic acid to provide a polyester glycol. A thermoplastic polyurethane is prepared by reacting said polyester glycol with an equamolar amount of a diisocyanate such as MDI following the procedures of Schollenberger et al, Rubber Chemistry and Technology, Vol. 35, pp 742 (1962). Commercially available thermoplastic polyurethanes complying with this description include Estane, Texin 80A, and Roylar E-9. Such thermoplastic polyurethanes can be described as reaction products of a polymeric polyol (e.g. a polyester glycol or a polyether glycol) with an organic diisocyanate (whether aromatic aliphatic or cycloaliphatic), frequently along with a low molecular weight befunctional material having two reactive hydrogens, such as a glycol or diamine. Such thermoplastic polyurethanes have no available-NCO groups and no olefin unsaturation. The examples herein featured the use of Roylar E-9 brand of thermoplastic polyurethane. A series of blends were prepared by thoroughly kneading and heating a mixture of pellets of Roylar E-9 polyurethane resin and pellets of a rubber modified interpolymer of methacrylic acid and styrene. Said rubber modified interpolymer of methacrylic acid and methacrylic acid prepared by mixing 80 parts of styrene and 10 parts of methacrylic acid, and adding 10 parts of Diene 35 a brand of polybutadiene marketed by Firestone. The butadiene is polymerized so that the structure of said Diene 35 comprises about 35% sis, about 55% trans and about 10% at the 1,2 polymerized position. The rubber is preformed prior to incorporation into the mixture of monomers, thus forming a block interpolymer. Although the methacrylic acid could react with water and/or cations, the carboxylic groups are stericly hindered in the polymer.

The reaction mixture for the precursor for the interpolymer is stirred at polymerizing conditions until about 30% of the reaction mixture is solid, and then the batch is dispersed in water for the continuation of the polymerization of the suspended particles. Such final stages of polymerization can follow the procedures of suspension polymerization as described by Bishop in "Practical Polymerization of Polystyrene" published by Cahners (1971). After such beads are formed, they can be cooled, rinsed, dried, and fed to an extruder for formation of molding pellets.

Articles were molded from the blends, as were specimens suitable for testing. One advantage of the blend is an outstandingly superior resistance to impact as measured by the Gardner Falling Weight (GFW) test.

The moldability, shape retention, and other characteristics of the blend provide an advantageous combination of properties for appropriate applications. Data concerning some controls and examples are shown in Table A.

TABLE A

| CODE | PU/S-MAA RUBBER MODIFIED | GFW IN/LB | IZOD | VICAT | FLEX. MODULUS ($\times 10^3$) |
| --- | --- | --- | --- | --- | --- |
| Control A | 0/100 | 14 | NA | NA | NA |
| Control B | 5/95 | 8 | 1.0 | 254° F. | 270 |
| Control C | 10/90 | 20 | 0.8 | 245° F. | 260 |
| Control D | 20/80 | 68 | 0.8 | 237° F. | 194 |
| Example 1 | 30/70 | 168 | 1.1 | 229° F. | 149 |
| Example 2 | 40/60 | 320 | 1.8 | 224° F. | 109 |
| Example 3 | 50/50 | 320 | 9.5 | 215° F. | 73 |
| Example 4 | 60/40 | 184 | NA | NA | NA |

By a series of tests, it is established that the concentration of the polyurethane should be within a range of about 30% to about 60% by weight of the blend. Similar tests showed that the concentration of the interpolymer should be from about 40% to about 70%. The interpolymer should contain from about 5 to about 35 unsaturated methacrylic acid and 51 to 85% styrene and about 8-16% rubber.

The invention claimed is:

1. Thermoplastic molding compositions consisting of a blend of:
   A. From about 40% to about 70% by weight of an interpolymer comprising from about 8 to about 16% block polyalkadiene about 51 to about 85% styrene and from about 5% to about 45% methacrylic acid.
   B. From about 30% to about 60% of a polyurethane thermoplastic rubber.

* * * * *

UNITED STATES PATENT AND TRADEMARK OFFICE
CERTIFICATE OF CORRECTION

PATENT NO. : 4,284,734

DATED : August 18, 1981

INVENTOR(S) : Clarence E. Chaney

It is certified that error appears in the above—identified patent and that said Letters Patent is hereby corrected as shown below:

Column 4, line 26, "45" should read -- 35 --.

Signed and Sealed this

Twentieth Day of October 1981

[SEAL]

Attest:

GERALD J. MOSSINGHOFF

Attesting Officer

Commissioner of Patents and Trademarks